United States Patent
Croak et al.

(10) Patent No.: US 8,793,150 B1
(45) Date of Patent: Jul. 29, 2014

(54) METHOD AND APPARATUS FOR INDICATING A TIMEFRAME MODIFICATION IN A PACKET-SWITCHED NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1748 days.

(21) Appl. No.: 11/022,627

(22) Filed: Dec. 27, 2004

(51) Int. Cl.
  *G06Q 10/00* (2012.01)
  *G06Q 20/00* (2012.01)
(52) U.S. Cl.
  USPC .......................................... 705/7.11; 705/80
(58) Field of Classification Search
  USPC ............................ 717/105; 705/8–9, 7.11, 80
  See application file for complete search history.

(56) References Cited

U.S. PATENT DOCUMENTS

| | | | |
|---|---|---|---|
| 6,285,688 B1* | 9/2001 | Henderson et al. | 370/516 |
| 6,938,081 B1* | 8/2005 | Mir | 709/223 |
| 6,958,977 B1* | 10/2005 | Mitrani et al. | 370/252 |
| 2002/0059512 A1* | 5/2002 | Desjardins | 713/1 |
| 2003/0065546 A1* | 4/2003 | Gorur et al. | 705/9 |
| 2005/0222815 A1* | 10/2005 | Tolly | 702/185 |
| 2006/0004618 A1* | 1/2006 | Brixius | 705/8 |

\* cited by examiner

*Primary Examiner* — Ahmad Matar
*Assistant Examiner* — Nafiz E Hoque

(57) ABSTRACT

A method and system for indicating at least one modification to at least one timeframe in a packet-switched network is described. In one example, a visual indicator is used to indicate the modification(s) made to the timeframe(s) associated with at least one test suite is provided. Similarly, a notification of the modification(s) is sent to at least one party impacted by the modification(s). In another example, approval for the modification(s) is obtained.

3 Claims, 3 Drawing Sheets

METHOD AND APPARATUS FOR INDICATING A TIMEFRAME MODIFICATION IN A PACKET-SWITCHED NETWORK

BACKGROUND OF THE INVENTION

1. Field of the Invention

Embodiments of the present invention generally relate to communication networks and, more particularly, to a method and apparatus for indicating a timeframe modification in a packet-switched network, e.g., a Voice over Internet Protocol (VoIP) network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. An exemplary circuit-switched network includes a plain old telephone system (POTS), such as the publicly switched telephone network (PSTN). Although circuit-switched networks have traditionally been used to provide an effective means for voice communication, packet-switched networks are currently being utilized on a more frequent basis. Another example of packet-switched networks is a Voice over Internet Telephony (VoIP) network.

In their procurement agreements with component suppliers, network providers must provide specifications of the features and functions that these vendors are required to meet. Although these requirements must remain stable over an agreed upon period of time, the timeframes needed for meeting subsets of features in these requirement specifications frequently change as a function of the shifting priorities faced by providers competing in a highly dynamic marketplace. Network providers who introduce new features quickly and inexpensively while providing reliable servers will tend to dominate the market. Hence suppliers to the network providers need to understand these new priorities and implement changes to their components as quickly as possible.

Accordingly, there exists a need in the art for a method and apparatus for monitoring changes to test suites to a packet-switched network.

SUMMARY OF THE INVENTION

In one embodiment, a method and system for indicating at least one modification to at least one timeframe in a packet-switched network is described. More specifically, a visual indicator is used to indicate the modification(s) made to the timeframe(s) associated with at least one test suite is provided. Similarly, a notification of the modification(s) is sent to at least one party impacted by the modification(s). In another example, approval for the modification(s) is obtained.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
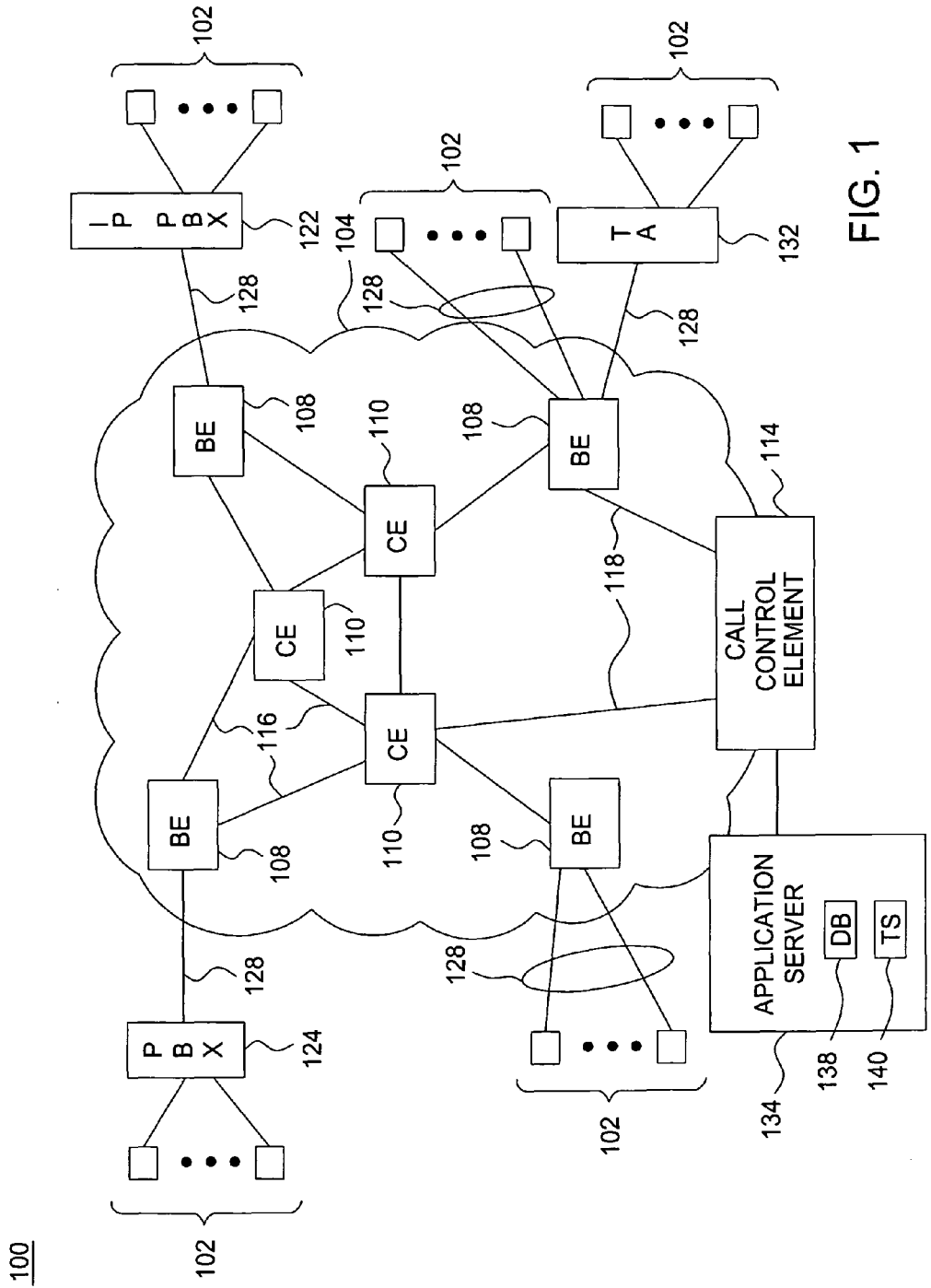
FIG. 1 is a block diagram depicting an exemplary embodiment of a communication system in accordance with the invention.

FIG. 1 depicts an exemplary embodiment of a communication system 100 in accordance with the invention. The communication system 100 comprises a plurality of endpoint devices 102 and a packet-switched network 104. The packet-switched network 104 illustratively comprises a plurality of border elements (BEs) 108, a plurality of core elements (CEs) 110, and a call control element (CCE) 114. The border elements 106 and the core elements 108 communicate via core communication links 116. The call control element 114 may be coupled to one or more of the core elements 110 or border elements 108 through communication link(s) 118. The packet-switched network 104 may comprise one or more of an internet protocol (IP) network, asynchronous transfer mode (ATM) network, frame relay network, and like type packet networks known in the art. For example, the packet-switched network 104 may comprise a voice-over-IP (VOIP) network.

A core element is a network element (such as a router, switch, cross-connect system, server, and the like) that facilitates control and communication between the border elements 106. A border element is a network element (such as a router, switch, cross-connect system, server, and the like) through which the endpoint devices 102 connect to the packet-switched network 104. A border element typically performs functions such as routing, switching, security, admission control, and the like. In one embodiment, a border element translates access protocols into Session Initiation Protocol (SIP), which is then used to facilitate communication within a service provider IP infrastructure.

For purposes of clarity by example, only three core elements 110 are depicted in FIG. 1. It is to be understood that the packet-switched network 104 may include fewer or more core elements 110. Similarly, although four border elements 108 are depicted in FIG. 1 by example, the packet-switched network 104 may include fewer or more border elements. Although the border elements 108 are depicted as being directly connected to the core elements 110, other intervening equipment (not shown) may be deployed.

The call control element (CCE) 114 resides within the VoIP infrastructure and is connected to the BEs using the Session Initiation Protocol (SIP) over the underlying packet-switched network 104. The CCE 114 is typically implemented as a Media Gateway Controller and performs network wide call control related functions as well as interacts with the appropriate VoIP service related servers when necessary. The CCE 114 functions as a SIP back-to-back user agent and is a signaling endpoint for all call legs between all BEs 108 and the CCE 114. The CCE 114 may need to interact with various VoIP related servers in order to complete a call that require certain service specific features, e.g. translation of an E.164 voice network address into an IP address. For purposes of clarity by example, the packet-switched network 104 is shown with one CCE 114. It is to be understood, however, that the packet-switched network 104 may include a plurality of call control elements, each configured to control various border elements, servers, and the like.

The application server 134 is coupled to the packet-switched network 104 via a connection to the call control element 114. The application server 134 may be any type of computer or device that stores data, manages network resources, and other conventional computing functions. Depending on the particular embodiment, there may be one or more application servers coupled to one or more call control elements 114. Similarly, although the application server 134 is shown to be coupled to the network 104, the server (or plurality of servers) may only be connected to the network via the call control element (or plurality of CCEs) in another embodiment.

The application server 134 may also contain a database 138. The database 138 may be an electronic filing system or any collection of information organized in such a way that the server 134 can quickly select desired pieces of data. In one embodiment, the database 138 contains component supplier names and their prospective component features they are developing. The server may also contain test suites 140. The test suites 140 may comprise a set of different tests or scenarios that incorporate various modifications a network provider may choose to implement, such as, in the event of a component feature upgrade. The test suites are occasionally used by the component supplier to test and certify the compatibility of the product with the VoIP network 104

An endpoint device 102 is typically a user terminal (such as a telephone, computer, and the like) by which one or more users communicate with other users in the communication system 100. Some of the endpoint devices 102 communicate with the border elements 108 via edge communication links 128. An endpoint device (such as a time division multiplexing (TDM) phone, an IP phone, an Integrated Services Digital Network (ISDN) phone, a computer, and the like) is able to establish a connection with a border element through the communication links 128. Some of the endpoint devices 102 are capable of being turned off and on or otherwise capable of toggling between an active state in which calls may be received and an inactive state in which calls cannot be received.

In one embodiment, an endpoint device connects to the packet-switched network 104 through a circuit-switched connection with a border element. In another embodiment, an endpoint device connects to the network 104 through an IP connection with a border element. In other embodiments, an endpoint device may connect to a border element via a Signaling System 7 (SS7) connection, a Digital Subscriber Line (DSL) connection, a cable television connection, a customer managed router connection, a customer managed gateway connection, a local area network connection, a frame relay (FR) connection, an asynchronous transfer mode (ATM) connection, and like access technologies as known in the art. Those skilled in the art will appreciate that numerous other techniques for establishing a connection between an endpoint device and a border element exist in the art.

Some of the endpoint devices 102 (e.g., TDM phones) connect to a border element through an edge communication link via a TDM Private Branch Exchange (PBX) 124. Other endpoint devices 102 (e.g., an IP phone) connect to a border element through an edge communication link via an IP Private Branch Exchange (IP-PBX) 122. Still others of the endpoint devices 102 (e.g., computer) connect to a border element through an edge communication link directly. Other endpoint devices 102 (e.g., ISDN phone) connect to a border element through an edge communication link via a terminal adapter (TA) 132.

Figure 2:
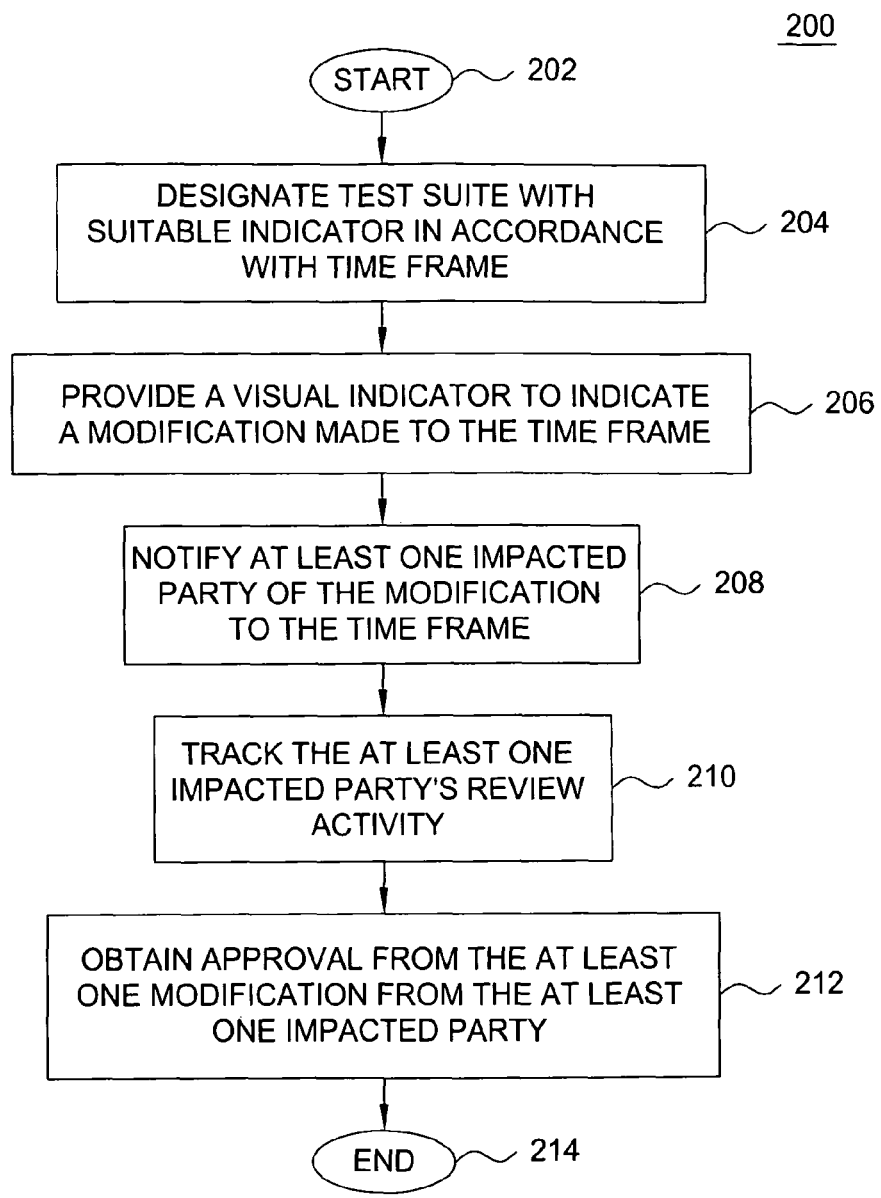
FIG. 2 is a flow diagram depicting an exemplary embodiment of a method for indicating a timeframe modification in a packet-switched network in accordance with the invention.

FIG. 2 is a flow diagram depicting an exemplary embodiment of a method 200 for indicating a timeframe modification in a packet-switched network in accordance with the invention. Aspects of the method 200 may be understood with reference to the communication system 100 of FIG. 1.

The method 200 begins at step 202. At step 204, the test suites are designated with suitable indicators in accordance with the present component feature timeframes. In one embodiment, this step may entail color-coding related test suites displayed on a web site or web page. In addition to providing the component requirements that the vendors are expected to meet, a test suite is also associated with the feature timeframes (i.e., an availability schedule for a particular feature) of a given component. The initial color-coding scheming of a test suite icon corresponds with the most recently designated timeframe or schedule.

In one embodiment, this color-coding scheme may include the designation of a particular color to a test suite icon (as displayed on a computer screen, television monitor, PDA screen, and the like) to represent the present timeframe status of a component feature. For example, consider an icon that represents a test suite for a call waiting feature. Suppose the network provider required the call waiting feature for a particular network component to be available within one month. The icon representing the test suite for the call waiting featured would have a unique color assigned to it (e.g., white) that would indicate that 4 weeks were still available for developing this component feature. More specifically, in one embodiment of this invention, an exclusive color is assigned to icons of test suites that are associated with particular component features with similar "development timeframes," i.e., component feature availability due dates. The colors may be assigned in units or time increments such as days, weeks, months, and the like. In one embodiment, this color-coding scheme is conducted and operated via an application server.

At step 206, a visual indicator to indicate a modification (or modifications) made to the timeframe of a component feature is provided. In one embodiment, this visual indicator comprises changing the color of the test suite icon associated with the modified component feature timeframe in accordance with the color-coding scheme detailed above. As a network provider's priorities shift and new agreements with vendors regarding the availability dates of certain component features are made, test suites (i.e., test suite icons) associated with these features need to reflect the new timeframe prioritization (i.e., the priority given to a feature's availability in comparison to other features). In one embodiment, an application server will acknowledge these modifications to the component feature timeframe and indicate the occurrence of these modifications by appropriately color-coded the relevant test suite icons. For example, if the network provider decided to change the required availability date of the call waiting feature in the previous example, the test suite icon associated with the call waiting feature would alter its color to reflect the change in the availability timeframe. In one embodiment, the test suite icon may also be colored in another shade or hue of the newly designated color in order to be more conspicuous. Similarly, in another embodiment, the test suite icon may be highlighted or flashing in order to be displayed more prominently.

At step 208, at least one impacted party is notified of the modification (or modifications) made to the component feature timeframe and its respective test suite in step 206. In one embodiment, an "impacted party" may include a component supplier who may have an interest in knowing when the modification in a particular timeframe for a given component feature occurs (e.g., the vendor is developing the particular component feature). In one embodiment, electronic notifications (e.g., e-mail) will automatically be sent to the impacted parties. The application server contains a database that associates the component suppliers and the prospective component features they are developing. With this recorded association, the application server is able to determine the appropriate impacted parties when the network provider makes a change to a component feature timeframe. In one embodiment, the electronic notifications indicate the recent changes made to the timeframe priorities associated with the features of a particular component. Similarly, these electronic notifications may solicit the impacted parties for acknowledgement and/or approval of the modifications to the timeframes associated with the test suites corresponding with the component features.

At step 210, the method 200 tracks each impacted party's review activity. In one embodiment, the application server hosting the web site will be able to monitor and record any impacted party's review of the recently prioritized test suites. The server may accomplish this task in several ways, such as recording the specific hyperlinks an impacted party selects, recording the test suites an impacted party downloads, and the like.

The method 200 continues to step 212 where approval from an impacted party for the modification to the test suite is obtained. In one embodiment, a server receives and records an electronic copy of an impacted party's approval. This electronic copy may be in the form of an e-mail, depressing a GUI-based button on the screen, downloading a test suite, and the like. The method 200 continues to step 214 and ends.

Figure 3:
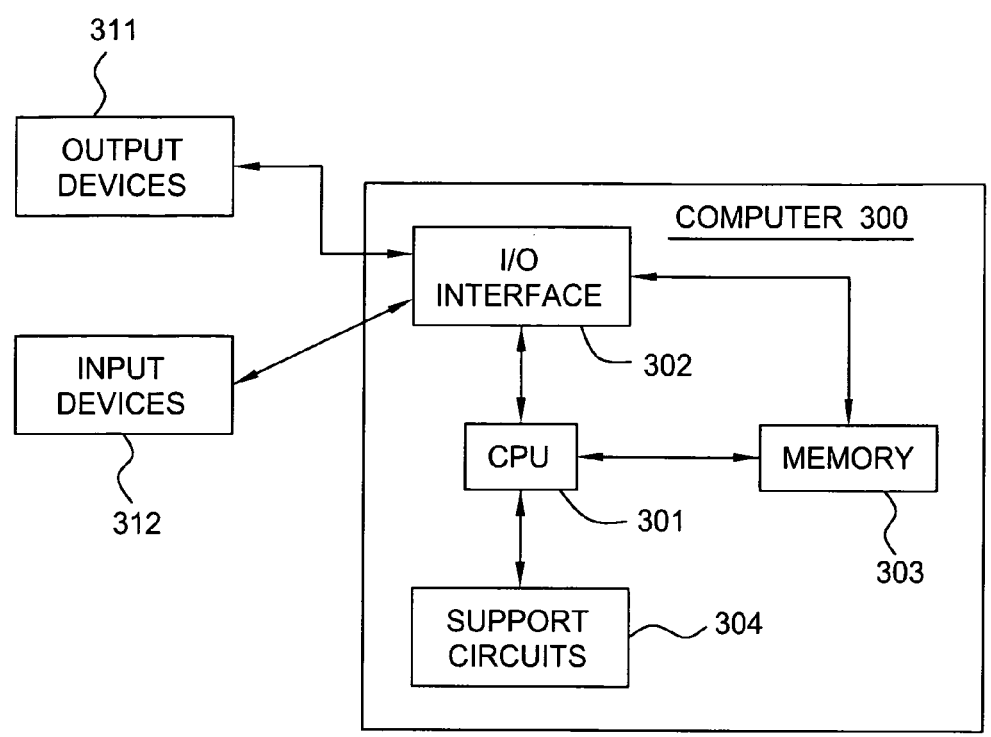
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the call control element 112, border elements 108, and core elements 110 of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like.

The memory 303 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

Currently, the burden is on the network provider to test a vendor's product to ascertain whether the device is compatible with the standards established by the network provider. Similarly, the vendor is only provided with a hardcopy of the standards or test suites used by the network provider so that the vendor may test the device.

The invention claimed is:

1. A method for indicating a modification to a timeframe associated with a network component feature and a test suite associated with the network component feature in a packet-switched network, comprising:

providing, by an application server, a visual indicator on a webpage to indicate the modification made to the timeframe associated with the network component feature and the test suite associated with the network component feature, wherein the test suite comprises a set of tests for testing and certifying the network component feature that is to be implemented in the packet-switched network, wherein the timeframe associated with the network component feature is a timeframe in which the network component feature is to be implemented in the packet-switched network, wherein the packet-switched network is a voice over internet protocol network, wherein the modification made to the timeframe comprises a change to a development schedule of the network component feature, wherein the providing the visual indictor comprises highlighting an icon associated with the test suite to indicate the modification is made to the timeframe;

providing, by the application server, a notification of the modification to a party impacted by the modification, wherein the party impacted by the modification comprises a vendor who is developing the network component feature, wherein the vendor comprises a component supplier with a procurement agreement with a provider of the packet-switched network, wherein the notification includes a solicitation for the vendor to approve the modification; and receiving, by the application server, via the webpage an approval for the modification from the vendor.

2. An apparatus for indicating a modification to a timeframe associated with a network component feature and a test suite associated with the network component feature in a packet-switched network, comprising:
- an application server comprising a processor, and a computer-readable medium storing instructions which, when executed by the processor, cause the processor to perform operations comprising:
  - providing a visual indicator on a webpage to indicate the modification made to the timeframe associated with the network component feature and the test suite associated with the network component feature, wherein the test suite comprises a set of tests for testing and certifying the network component feature that is to be implemented in the packet-switched network, wherein the timeframe associated with the network component feature is a timeframe in which the network component feature is to be implemented in the packet-switched network, wherein the packet-switched network is a voice over internet protocol network, wherein the modification made to the timeframe comprises a change to a development schedule of the network component feature, wherein the providing the visual indictor comprises highlighting an icon associated with the test suite to indicate the modification is made to the timeframe;
  - providing a notification of the modification to a party impacted by the modification, wherein the party impacted by the modification comprises a vendor who is developing the network component feature, wherein the vendor comprises a component supplier with a procurement agreement with a provider of the packet-switched network, wherein the notification includes a solicitation for the vendor to approve the modification; and
  - receiving via the webpage an approval for the modification from the vendor.

3. A non-transitory computer readable storage medium storing instructions which, when executed by a processor of an application server, cause the processor to perform operations for indicating a modification to a timeframe associated with a network component feature and a test suite associated with the network component feature in a packet-switched network, the operations comprising:
- providing a visual indicator on a webpage to indicate the modification made to the timeframe associated with the network component feature and the test suite associated with the network component feature, wherein the test suite comprises a set of tests for testing and certifying the network component feature that is to be implemented in the packet-switched network, wherein the timeframe associated with the network component feature is a timeframe in which the network component feature is to be implemented in the packet-switched network, wherein the packet-switched network is a voice over internet protocol network, wherein the modification made to the timeframe comprises a change to a development schedule of the network component feature, wherein the providing the visual indictor comprises highlighting an icon associated with the test suite to indicate the modification is made to the timeframe;
- providing a notification of the modification to a party impacted by the modification, wherein the party impacted by the modification comprises a vendor who is developing the network component feature, wherein the vendor comprises a component supplier with a procurement agreement with a provider of the packet-switched network, wherein the notification includes a solicitation for the vendor to approve the modification; and
- receiving via the webpage an approval for the modification from the vendor.

\* \* \* \* \*